United States Patent
Futamura et al.

(10) Patent No.: US 6,852,189 B2
(45) Date of Patent: Feb. 8, 2005

(54) METHOD AND APPARATUS FOR MANUFACTURING LAMINATES

(75) Inventors: Shoji Futamura, Atsugi (JP); Chikara Murata, Yokohama (JP)

(73) Assignee: Institute of Technology Precision Electrical Discharge Work's, Kanagawa (JP)

( * ) Notice: Subject to any disclaimer, the term of this patent is extended or adjusted under 35 U.S.C. 154(b) by 101 days.

(21) Appl. No.: 10/399,208

(22) PCT Filed: Dec. 25, 2001

(86) PCT No.: PCT/JP01/11343
§ 371 (c)(1),
(2), (4) Date: Apr. 14, 2003

(87) PCT Pub. No.: WO03/055682
PCT Pub. Date: Jul. 10, 2003

(65) Prior Publication Data
US 2004/0011456 A1 Jan. 22, 2004

(51) Int. Cl.[7] .............................................. B32B 31/00
(52) U.S. Cl. ...................... 156/252; 156/256; 156/513
(58) Field of Search .................................. 156/250, 252, 156/253, 256, 510, 513, 580, 581

(56) References Cited

U.S. PATENT DOCUMENTS

| | | | | |
|---|---|---|---|---|
| 4,959,115 A | * | 9/1990 | Lacy | 156/264 |
| 6,056,843 A | * | 5/2000 | Morita et al. | 156/250 |
| 6,682,625 B1 | * | 1/2004 | Futamura et al. | 156/252 |

FOREIGN PATENT DOCUMENTS

| | | |
|---|---|---|
| EP | 0 919 306 A1 | 6/1999 |
| JP | 63-248528 | 10/1988 |
| JP | 6-114467 | 4/1994 |
| JP | 10-235598 | 9/1998 |

\* cited by examiner

*Primary Examiner*—James Sells
(74) *Attorney, Agent, or Firm*—McGlew and Tuttle, P.C.

(57) ABSTRACT

In a method for manufacturing laminates comprising a plurality of continuously formed component members having different cross-sectional shapes, a long-sized workpiece is indexed in the longitudinal direction, the component members having outside contours corresponding to each of the cross-sectional shapes of the laminate are formed with non-separating indentation, with at least part of the outside contours left unseparated from the workpiece, and the component members are sequentially punched out and laminated into one piece in the final stage of indexing of the workpiece.

20 Claims, 13 Drawing Sheets

FIG. 4
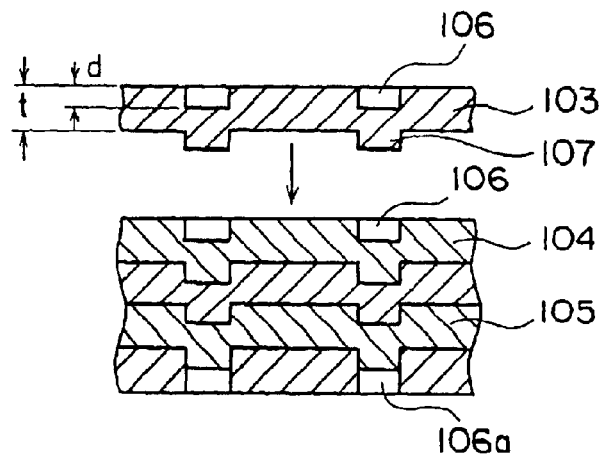
FIG. 5A
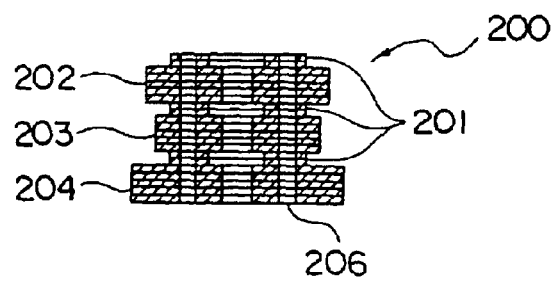
FIG. 5B   FIG. 5C   FIG. 5D   FIG. 5E
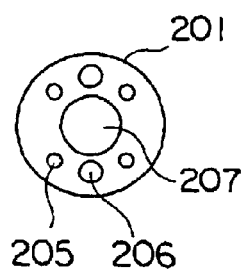 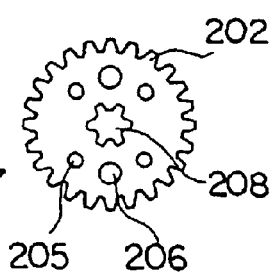 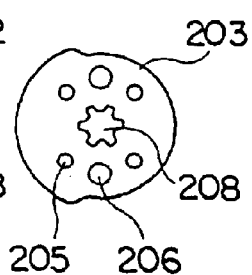 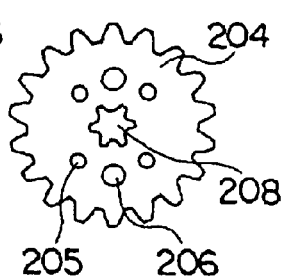

1

METHOD AND APPARATUS FOR MANUFACTURING LAMINATES

TECHNICAL FIELD

The present invention relates to a method and apparatus for manufacturing laminates comprising a plurality of continuously formed component members having different cross-sectional shapes.

BACKGROUND ART

FIG. 1 shows diagrams of assistance in explaining a laminate to which the present invention is applied; (A) being a front view and (B) a plan view. FIG. 2 shows cross-sectional diagrams taken on lines in FIG. 1(A); FIGS. 2(A) through (E) showing cross-sectional views taken on lines A—A, B—B, C—C, D—D and E—E, respectively.

When manufacturing a laminate 100 as shown in FIG. 1 with a steel material, for example, parts having a circular cross section as shown in FIGS. 2(B) and (D) can be turned with a lathe, but the manufacture of parts having regular tetragonal, orthohexagonal and quasi cruciform cross sections as shown in FIGS. 2(A), (C) and (E) involves extremely complicated machining operations requiring great man-hours and time.

It is cumbersome and complicated, or sometimes even totally impossible, to machine a laminate 100 having the aforementioned construction from a sold round bar or a block piece. For this reason, there can be a method of dividing the laminate 100 into a plurality of component members, machining these members, and assembling the machined members into one piece. If the laminate 100 is of a small size, however, assembling such machined members might be impossible.

Casting, for example, is sometimes employed to manufacture the aforementioned laminate 100 having a complex shape. The manufacture of the laminate 100 by casting involves multiple processes, such as preparing a model, forming a casting mold based on the model, and pouring molten metal into the mold, requiring a lot of man-hours and time.

Even when a precision casting method, including lost-wax process, is employed, it is difficult to maintain high precision and produce a highly smooth casting surface. This necessitates finishing the cast surface, leading to increased cost to manufacture the laminate 100.

To solve the abovementioned problem, the present Applicant had already filed a patent application in Japan for an invention of manufacturing laminates having multiple cross-sectional shapes by progressively transferring (indexing) a hoop-shaped long-sized workpiece in the longitudinal direction, punching a plurality of component members having the contours corresponding to the cross-sectional shapes of the laminate, temporarily holding the punched component members on the punched holes of the workpiece by pushback, sequentially stamping out the component members in the final stage of the indexing of the workpiece, and assembling the component members into one piece (Japanese Unexamined Published Patent Application No. Hie-10(1998)-235598).

However, it was found that there still remain some problems in the improvement patent. That is, since the punched component members are temporarily held on the punched hole only by frictional force between the member and the hole, the punched component members may sometimes come off from the punched holes due to vibrations during indexing or some other reasons, interrupting the indexing operation.

Furthermore, the punched component members may be slightly deformed or subjected to dimensional changes when pushed back to replace to the punched holes.

The present invention is intended to overcome the aforementioned problems, and it is an object of the present invention to provide a method for relatively easily manufacturing laminates by continuously forming a plurality of component members having different cross-sectional shapes.

It is another object of the present invention to provide a method for manufacturing laminates in which the bonding strength of a laminate made by continuously forming and laminating a plurality of component members having different cross-sectional shapes can be easily increased.

It is still another object of the present invention to provide an apparatus for relatively easily manufacturing laminates by continuously forming a plurality of component members having different cross-sectional shapes.

It is a further object of the present invention to provide an apparatus for manufacturing laminates in which the bonding strength of the laminate made by continuously forming and laminating a plurality of component members having different cross-sectional shapes can be easily increased.

DISCLOSURE OF THE INVENTION

To achieve these objectives, the method for manufacturing a laminate made by continuously forming a plurality of component members having different cross-sectional shapes according to the present invention employs the indexing of a long-sized workpiece in the longitudinal direction, the non-separating indentation of a workpiece into a plurality of component members having contours corresponding to the respective different cross-sectional shapes of the laminate in a state where at least part of the contours are left unseparated from the workpiece, and the sequential stamping out of the component members from the workpiece in the final stage of the indexing of the workpiece to assemble them into one piece.

In the above invention, dowel pins and dowel holes are concentrically provided on the component members so that the dowel pins are engaged with the dowel holes on the adjacent component members. In this case, only through holes can be formed on the component member constituting the lowest layer.

In the above invention, moreover, a plurality of guide through-holes are provided on the component members so as to position the component members by engaging guide pins with the guide holes.

In the above invention, moreover, a workpiece on the surface of which adhesive is deposited can be used. In this case, the adhesive can be provided in stripes or in bands.

In the above invention, a workpiece on the surface of which a thin film containing lubricant is deposited can be used.

In the method for manufacturing laminates according to the present invention where component members having contours corresponding to the cross-sectional shapes of the laminate are formed from a sheet material, and the component members are sequentially and continuously laminated into one piece, a long-sized workpiece is progressively transferred (indexed) in the longitudinal direction, clearance holes or projections at locations corresponding to the clearance holes are provided within the outside contours, the component members having predetermined outside contours are formed with the non-separating indentation process in a state where at least part of the contours are left unseparated from the workpiece, the component members are sequentially stamped out and laminated in the final stage of the indexing of the workpiece, the projections are engaged with the clearance holes on the underlying component members, and the component members are welded to the other non-adjoining component members to laminate them into one piece.

In the method for manufacturing laminates according to the present invention, an irregular-shaped laminate having continuously formed different cross-sectional shapes can be formed by a plurality of component members having different contours and/or outside dimensions.

In the above method for manufacturing laminates, the projections can be formed in such a manner that h> at (a being a positive integer larger than 1) when the thickness of the workpiece is t, and the height of the projections is h.

In the above method for manufacturing laminates, the projections can be formed by burring, or slitting and forming.

In the above method for manufacturing laminates, furthermore, the outside surface of the projections can be kept electrically unconnected to the inside surface of the clearance holes.

In the above method for manufacturing laminates, dowel holes and dowel pins are concentrically formed on the upper and lower surface within the contour so that the adjoining component members can be laminated by engaging the dowel pins with the dowel holes on the component members.

The apparatus for manufacturing laminates continuously formed by a plurality of component members having different cross-sectional shapes according to the present invention comprises a feed control device for indexing the workpiece in the longitudinal direction, a plurality of punch-die sets disposed in the feeding direction of the workpiece for forming the component members having outside contours corresponding to the cross-sectional shapes thereof with the non-separating indentation process in such a manner that at least part of the outside contours are left unseparated from the workpiece, and a laminating device provided on the most downstream side of the punch-die sets in the workpiece feeding direction for sequentially indenting and laminating the component members into one piece; the punch-die sets adapted to be selectively operable.

The apparatus for manufacturing laminates continuously formed by a plurality of component members having different cross-sectional shapes by forming from a sheet material component members having outside contours corresponding to the cross-sectional shapes of the laminate, and sequentially laminating them into one piece according to the present invention comprises a feed control device for indexing a long-sized workpiece in the longitudinal direction, a plurality of first punch-die sets for forming clearance holes that pass through the abovementioned outside contours, a plurality of second punch-die sets for forming a plurality of component members with the non-separating indentation process in a state where at least part of the outside contours are left unseparated from the workpiece, and a laminating device provided on the most downstream side of the workpiece in the workpiece feeding direction; the laminating device comprising a holding device having holes that allow the component members to pass and adapted to constrain the downward movement of the workpiece, a pressure-welding device provided above the holding device and equipped with vertically movable pressure-welding electrodes for punching out, laminating and pressure-welding the component members, and a support device provided below the holding device and having vertically movable support members that can hold the stamped component members; and a selectively operable welding power supply being connected between the pressure-welding device and the support device.

In the apparatus for manufacturing laminates according to the present invention, a plurality of laminating devices can be provided in the feeding direction of the workpiece in such a manner that these laminating devices can be operated alternately.

Another apparatus for manufacturing laminates continuously formed by a plurality of component members having different cross-sectional shapes by forming from a sheet material component members having outside contours corresponding to the cross-sectional shapes of the laminate, and sequentially laminating them into one piece according to the present invention comprises a feed control device for indexing a long-sized workpiece in the longitudinal direction, a plurality of punch-die sets for forming a plurality of component members with the non-separating indentation process in such a manner that at least part of the outside contours are left unseparated from the workpiece, and a laminating device provided on the most downstream side of the workpiece for sequentially stamping out and laminating the component members into one piece; the laminating device comprising a holding device having holes for allowing the component members to pass and adapted to constrain the downward movement of the workpiece, a pressure-welding device provided above the holding device and equipped with vertically movable pressure-welding punches for stamping out, laminating and pressure-welding the component members, a support device provided below the holding device and equipped with vertically movable support members that can hold the stamped component members; a plurality of the laminating devices provided in the feeding direction of the workpiece in such a manner that these laminating devices can be operated alternately. In another apparatus for manufacturing laminates described above, there can be a construction where every time the component members are laminated and pressure welded in the pressure-welding device, the support members descend by a distance equal to the thickness of the component members and stop at that position.

In another apparatus for manufacturing laminates described above, moreover, punch-die sets can be provided to concentrically form dowel holes and dowel pins each on the upper and lower surfaces of the outside contours.

BRIEF DESCRIPTION OF THE DRAWINGS

FIG. 4 is an enlarged longitudinal sectional view showing the component members laminated into one piece in an embodiment of the present invention.

FIGS. 5(A) through 5(E) are diagrams of assistance in explaining another laminate and the component members thereof; (A) being a longitudinal sectional view of the laminate, and (B) through (E) being the component members constituting the laminate.

BEST MODE FOR CARRYING OUT THE INVENTION

FIGS. 3(A) through 3(G) are diagrams of assistance in explaining a laminate and the component members thereof in an embodiment of the present invention; (A) and (B) being a front view and a plan view of the laminate; and (C) through (G) being plan views of the component members constituting the laminate.

Figure 1A:
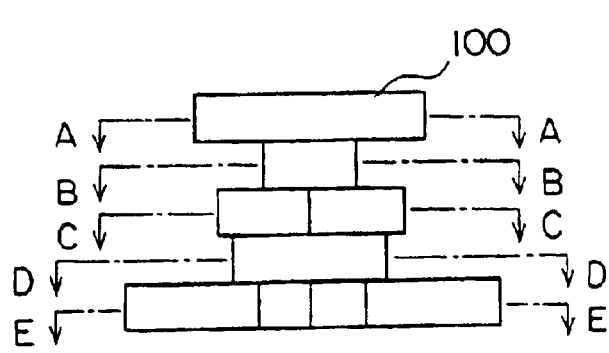
FIGS. 1(A) and 1(B) are diagrams of assistance in explaining a laminate to which the present invention is applied; (A) being a front view and (B) a plan view.
Figure 1B:
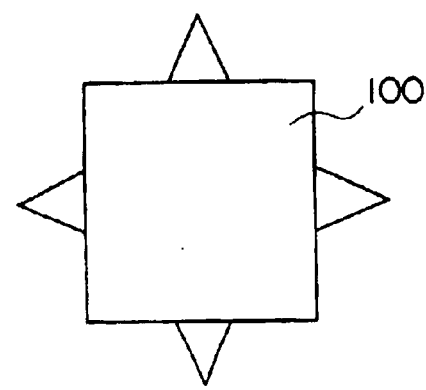
Figure 2A:
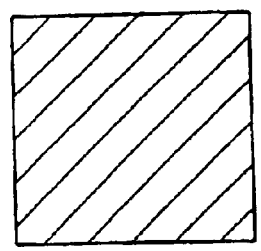
FIGS. 2(A) through 2(E) are cross-sectional views taken on lines A—A, B—B, C—C, D—D and E—E, respectively, in FIG. 1(A).
Figure 2B:
Figure 2C:
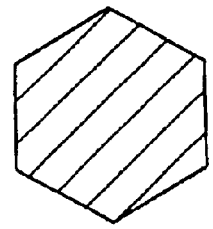
Figure 2D:
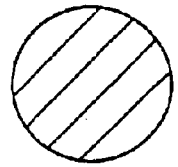
Figure 2E:
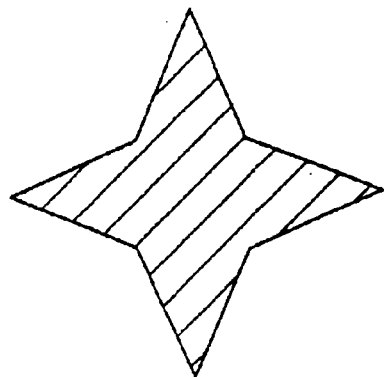

In FIG. 3, a laminate 100 is of essentially the same shape as that shown in FIG. 1, and formed by laminating a plurality (two in FIG. 3) each of multiple types of component members 101~105 having outside contours corresponding to the cross-sectional shapes at each position in the height direction into one piece.

Numeral 106 refers to dowel holes (or blind holes) formed into the same shape and dimensions at the central part on the flat surface of the component members 101~105 at the same relative positions with means as will be described later. The number of component members 101~105 may be only one, or three or more, depending on the shape and dimensions of the laminate 100.

FIG. 4 is an enlarged longitudinal sectional view illustrating an example of laminating component members into one piece in an embodiment of the present invention. Like parts are indicated by like reference numerals as used in FIG. 3.

In FIG. 4, numeral 107 refers to dowel pins formed concentrically with the dowel holes 106. The dowel holes 106 and the dowel pins 107 can be formed with a punch and die having a circular cross-sectional shape by making the penetration depth d of the punch into the die smaller than the thickness t of the component members 103~105 (same applies to the component members 101 and 102 in FIG. 3). The dowel holes 106 and the dowel pins 107 may be formed either simultaneously with the punching of the component members 101~105 in FIG. 3 from a steel sheet, for example, using punch-die sets, or in any of appropriate processes different from the punching process of the component members 101~105.

The component members 101~105 formed in the aforementioned manner can be sequentially laminated into one piece by engaging the dowel pins 107 with the dowel holes 106 on the adjoining component members as shown in FIG. 4.

In this case, the dowel holes 106 and the dowel pins 107 can be served as positioning means for lamination since the dowel holes 106 and the dowel pins 107 are formed into the same shape and dimensions and provided at the central part of the component members 101~105 at the same relative positions.

Figure 3A:
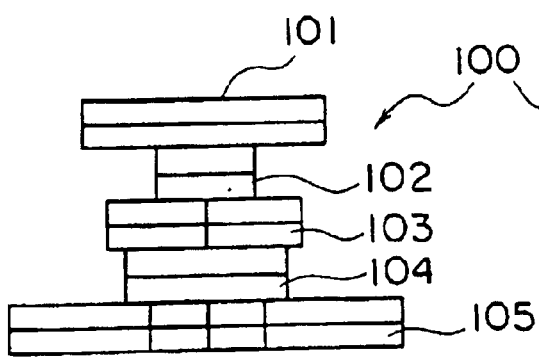
FIGS. 3(A) through (G) are diagrams of assistance in explaining a laminate and the component members thereof in an embodiment of the present invention; (A) and (B) being a front view and a plan view of the laminate; and (C) through (G) being plan views of the component members constituting the laminate.
Figure 3B:
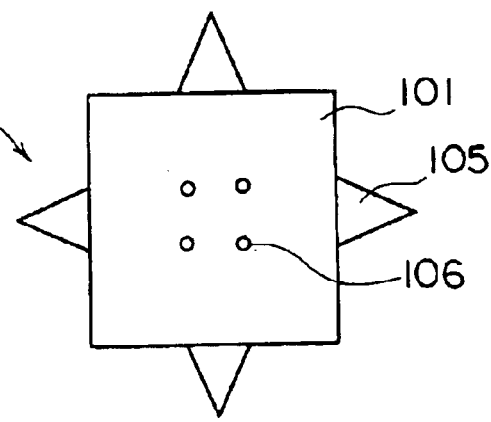
Figure 3C:
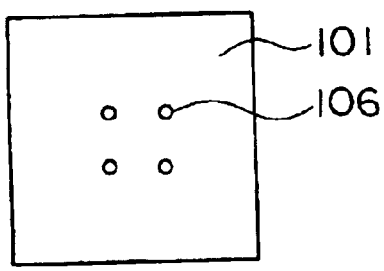
Figure 3D:
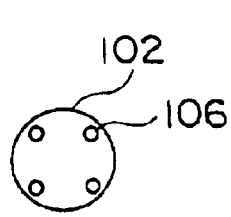
Figure 3E:
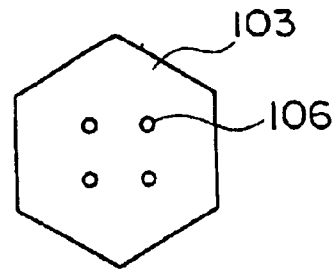
Figure 3F:
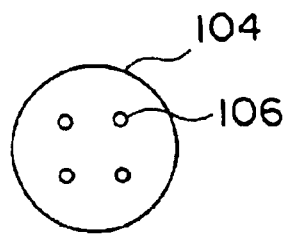
Figure 3G:
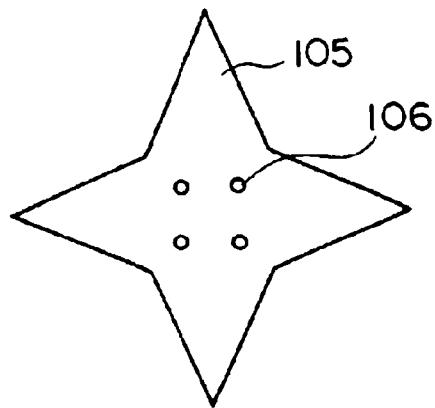

The dowel pins 107 need not be provided on the component member 105 at the lowest layer, and through holes 106a should preferably be provided instead. By sequentially laminating the component members 101~105 in the aforementioned manner, the laminate 100 as shown in FIGS. 3(A) and 3(B) can be manufactured.

FIGS. 5(A) through 5(E) are diagrams of assistance in explaining another laminate and the component members thereof in an embodiment of the present invention; (A) being a longitudinal sectional view of the laminate, and (B) through (E) being plan views of the component members constituting the laminate, respectively. The laminate 200 in FIG. 5 is manufactured by punching component members 201~204 from a steel sheet, for example, with punch-die sets, and laminating them into one piece, as in the case with the laminate shown in FIG. 3.

In FIG. 5, numeral 205 refers to dowel holes formed on the top surface of the component members 201~204, and dowel pins (not shown) are concentrically formed on the bottom surface thereof in the same manner as those shown in FIG. 4. Numeral 206 refers to guide holes formed passing through the component members 201~204 so that the positioning accuracy of the component members 201~204 can be improved by engaging the guide holes with guide pins provided upright on the laminating device during laminating and pressure-welding operations. Numeral 207 refers to a round hole, 208 to a spline hole, both formed passing through the central part of the component members 202~204.

A laminate 200 is formed by sequentially laminating the component members 201~204 formed in the aforementioned manner into one piece, as shown in FIG. 5(A). That is, gear parts can be formed on the outer circumferential surface of the component members 202 and 204, and a cam part on the outer circumferential surface of the component member 203, respectively; with a spacer part provided between the cam and gear parts. The outer circumferential surfaces of the cam and gear parts are accurately positioned and formed with high precision, capable of fully performing their respective functions since positioning accuracy can be improved by not only engaging the dowel pins (not shown) of the component members 201~204 with the dowel holes thereof, but also engaging the guide pins with the guide holes 206.

Figure 6:
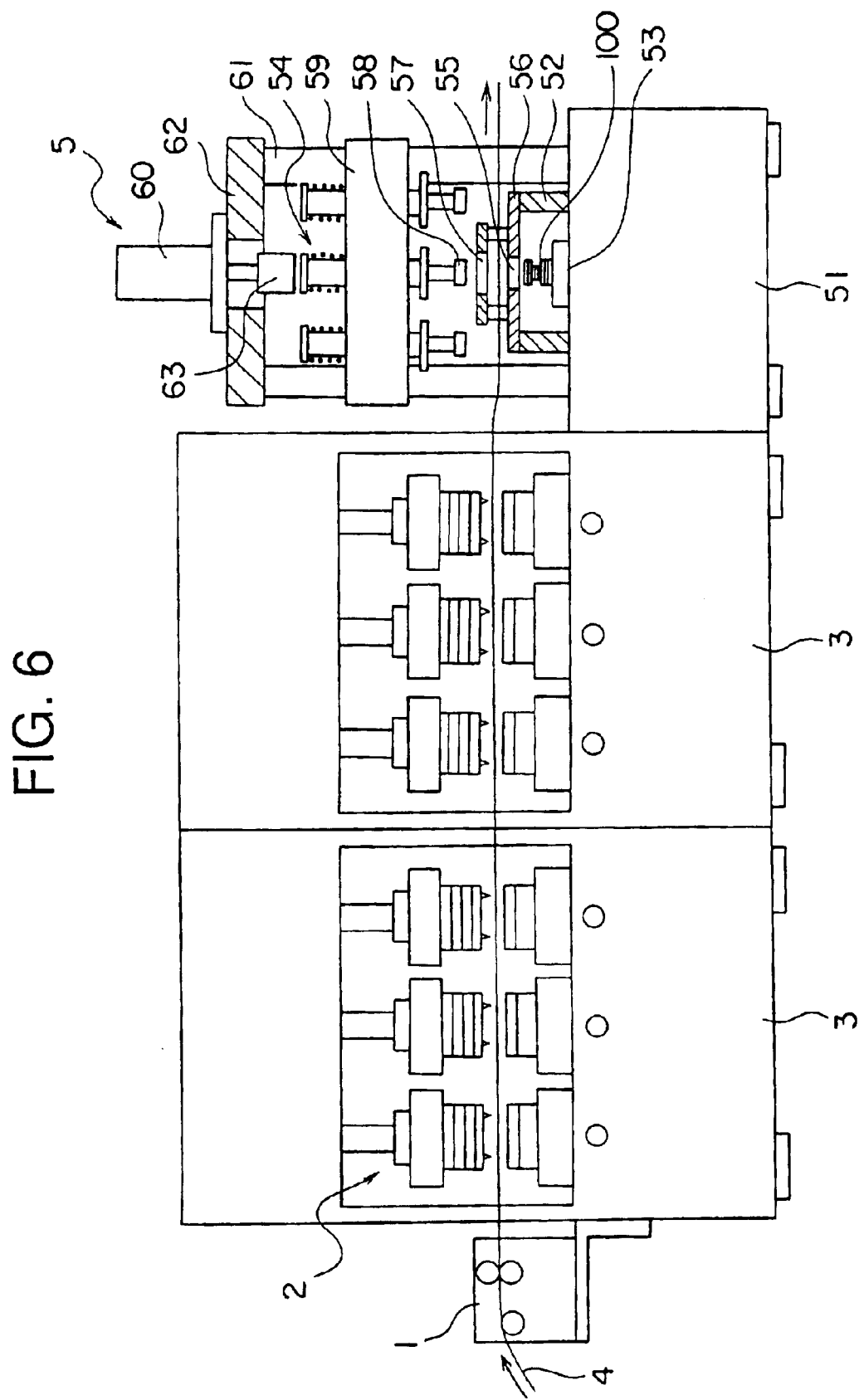
FIG. 6 is a front view illustrating an embodiment of the present invention.

FIG. 6 is a front view showing an embodiment of the present invention.

In FIG. 6, numeral 1 refers to a feeding device, 2 to a punch-die set, and 5 to a laminating device, disposed in this order in the feeding direction of the workpiece 4. That is, the feeding device 1, disposed on the most upstream side of the feeding direction of the workpiece 4, is constructed so as to index in the longitudinal direction the workpiece 4 coiled into a hoop. Note that the feeding device 1 may be provided on the downstream side of the laminating device 5, or between the base machines 3 and 3, which will be described later.

The punch-die set 2 has an after-mentioned construction, and is disposed at intervals of mP (m being a given positive integer, and P being a feeding pitch of the workpiece 4). A plurality of punch-die sets 2 (three sets in FIG. 6) are provided in the base machine 3, for example, and have such a construction that each punch-die set 2 can be positioned in the feeding direction of the workpiece 4 and operated selectively. These punch-die sets 2 are provided corresponding to the types of the component members so that component members as shown in FIGS. 2 and 5 can be formed. In this case, an appropriate number of the base machines 3 having a plurality of punch-die sets 2 can be provided in tandem in the feeding direction of the workpiece 4.

The laminating device 5 is provided on the most downstream side in the feeding direction of the workpiece 4 at intervals nP (n being a given positive integer) and comprises a base 51, a holding device 52, a support device 53 and a pressure-welding device 54.

The holding device has a holding plate 56 having a hole 55 for constraining the downward movement of the workpiece 4 and allowing the component members (not shown. As indicated by each of the numerals 101~105 in FIG. 3, for example) to pass, and a guide member 57 formed in such a manner as to press and release the workpiece 4. The support device 53 provided below the holding device 52 is formed in such a manner that the aforementioned component members and the laminate 100 are placed on the support device 53.

On the pressure-welding device 54 provided above the holding device 52 provided is a pressure-welding punch 58 vertically movably formed so that the component members can be punched out from the workpiece, laminated and pressure welded. Multiple types of the pressure-welding devices 58 having outside contours similar to, or corresponding to the outside contours of the aforementioned component members are provided on a holder 59 so that a predetermined pressure-welding punch 58 can be selectively placed immediately above the workpiece 4 by rotating the holder 59 around the vertical axis thereof.

Numeral 60 refers to an actuating device comprising a hydraulic cylinder, for example, to cause the pressure-welding punch 58 to come in contact with, or detach from, the workpiece 4 via a column 61 and a support plate 62 provided on the base 51.

Figure 7:
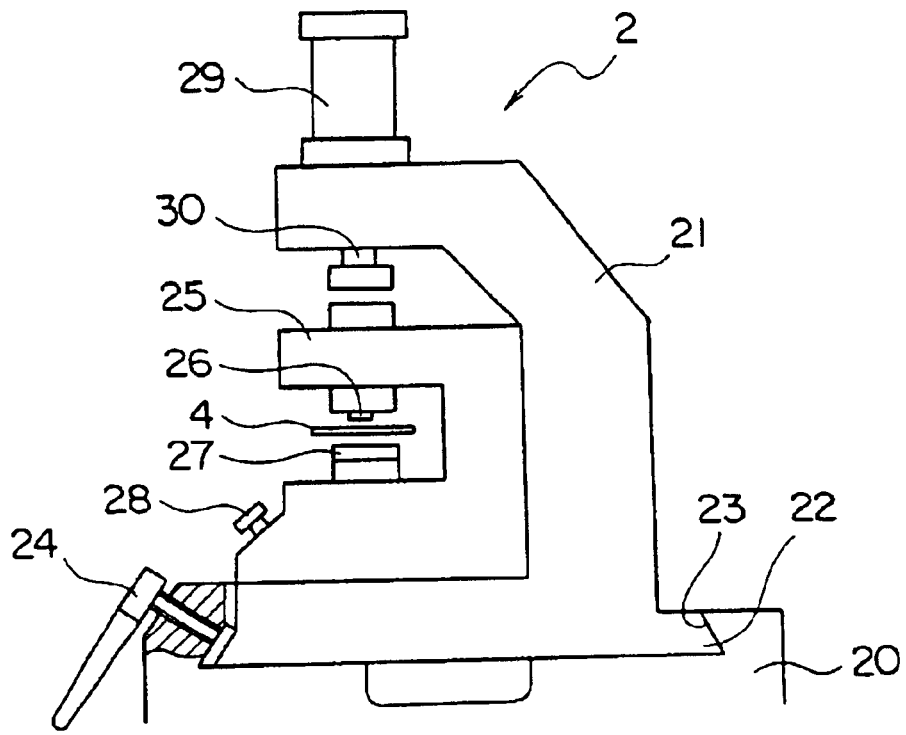
FIG. 7 is a side view illustrating an example of the punch-die set in FIG. 6.

FIG. 7 is a side view illustrating an example of the punch-die set in FIG. 6.

In FIG. 7, numeral 21 refers to a punch-die set proper, formed of a steel material, for example, into an approximately U shape, having an integrally formed dovetail 22 on the lower end thereof to engage with a dovetail groove 23 provided on the base 20 so that the position of the set proper 21 can be moved and adjusted in the feeding direction (in the direction vertical to the page) of the workpiece 4, and the movement of the set proper 21 in the direction vertical to the feeding direction, that is, in the horizontal direction in FIG. 7, can be constrained. Once positioned, the set proper 21 is held in position on the base 20 by a clamp device 24. The punch-die set 2 may be a gate-type set proper comprising an upper and lower ones connected with four guide bars.

Numeral 25 refers to a cassette formed of a steel material, for example, into an approximately U shape, with a punch 26 vertically movably provided on the upper part thereof and a die 27 provided on the lower part thereof at a position facing the punch 26. The cassette 25 is detachably provided on the set proper 21. Numeral 28 refers to a clamp screw for fixedly fitting the cassette 25 to the set proper 21. Numeral 29 refers to a hydraulic cylinder provided on the upper end of the set proper 21 to cause the punch 26 to be operated via an actuating rod 30.

Figure 8:
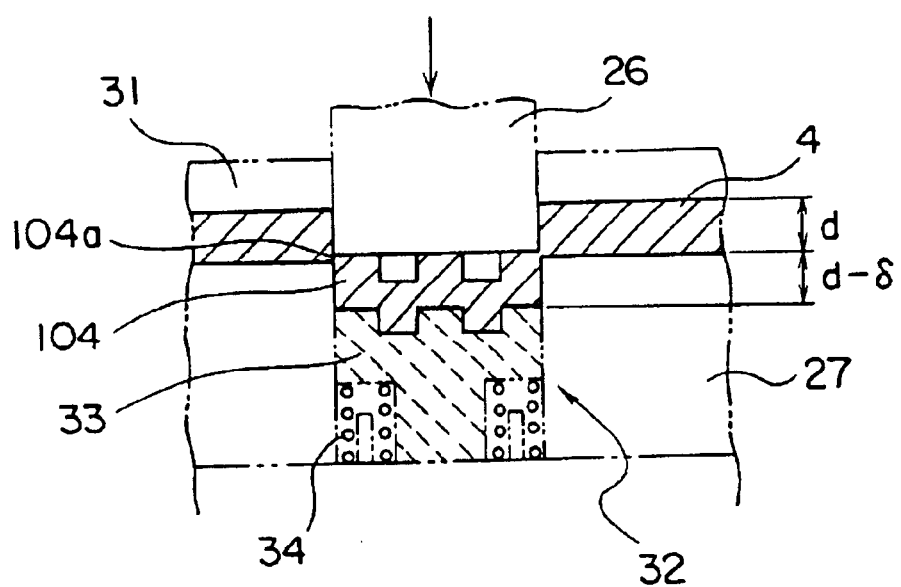
FIG. 8 is an enlarged cross-sectional view illustrating an example of the non-separating indentation means in an embodiment of the present invention.

FIG. 8 is an enlarged cross-sectional view illustrating an example of non-separating indentation means in an embodiment of the present invention. Like parts are indicated by like numerals in FIGS. 4 and 7. Component members are indicated by numeral 104.

In FIG. 8, numeral 31 refers to a stripper for forcing the workpiece 4 in place on the surface of the die 27 before and after the actuation of the punch 26.

Numeral 32 refers to non-separating indentation means, provided in the die 27, comprising a vertically movably formed receiving member 33, and a compression spring 34 for upwardly preloading the receiving member 33. As means for energizing the receiving member 33, drive means such as a hydraulic cylinder may be used. In such a case, the upper end of the receiving member 33 should be held at a position (d-ä) away from the upper end of the die 27. That is, with the thickness d of the workpiece 4, ä is set to ä=0.1~0.2 mm, including the amount of compression deformation of the workpiece 4.

With the aforementioned construction, when the punch 26 descends while the workpiece 4 is kept forced onto the upper surface of the die 27 with the stripper, as shown in FIG. 8, the component member 104 is indented, causing the receiving member 33 to descend down to the lower limit thereof. In this case, the component member 104 is subjected to the so-called non-separating indentation process where the component member 104 remains not completely punched out of the workpiece 4, with the outside contour thereof connected to the workpiece 4 via connecting parts 104a of a very small thickness δ, for example.

The connecting parts 104a may of course be formed over the entire outside contour of the component member 104, but should be formed at least part of the outside contour of the component member 104 by selecting the shape of the punch 26 appropriately.

After the punch 26 is lifted, the component member 104 is pushed upwards, together with the workpiece 4, from the die 27 by the upward preloading force of the compression spring 34 as the stripper 31 is lifted. The component member 104 is then transported to the final stage, while left connected to the workpiece 4, as the workpiece 4 is indexed.

Figure 9:
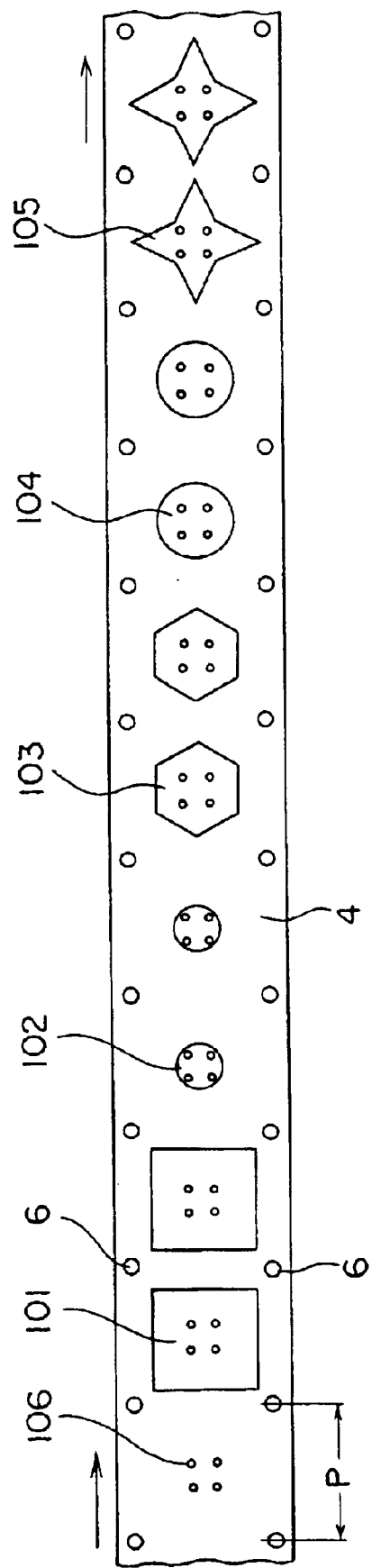
FIG. 9 is a plan view illustrating the processing of a workpiece in an embodiment of the present invention.

FIG. 9 is a plan view showing the state where the workpiece is processed in an embodiment of the present invention to produce component members 101~105 for manufacturing the laminate 100 shown in FIG. 3.

In FIG. 9, the workpiece 4 is indexed at intervals of P in the direction shown by arrows by the feeding device shown in FIG. 6. Numeral 6 refers to pilot holes provided on the workpiece 4 at intervals of P on the most upstream side of the punch-die set 2 shown in FIG. 6 to serve as reference holes for positioning in the subsequent processes.

With the punch-die set 2 similar to that described above, dowel holes 106 are processed, and dowel pins (not shown. Refer to numeral 107 in FIG. 4) are also provided concentrically with the dowel holes 106. In this case, pilot pins for engaging with the pilot holes 6 are provided on the punch-die set 2 for subsequent processing with the punch-die set 2 by positioning the workpiece 4 using the pilot holes 6 as reference (same applies to the punch-die sets in the succeeding processes). By sequentially indexing the workpiece 4, moreover, component members 101~105 are processed with the non-separating indentation process, as shown in FIG. 8. In this case, the punch-die sets 2 as shown in FIG. 6 having five types of punches and dies corresponding to the outside contours of the component members 101~105 are disposed in such a manner that these punch-die sets 2 can be operated selectively. Two pieces, for example, each of the component members 101~105 corresponding to the laminate 100 shown in FIG. 3 are formed and sequentially subjected to processing and transported to the final stage.

The component members 101~105 formed on the workpiece 4 with the non-separating indentation process as described above are transported to the laminating device 5 provided in the final stage in FIG. 6, and sequentially laminated in the order from the component member 105 to 101 into one piece. That is, as the guide member 57 descends, and the pilot pins are engaged with the pilot holes 6 on the workpiece 4 to position and force the workpiece 4 in place, the actuating device 60 is operated to sequentially punch out the component members 101~105 completely from the workpiece 4 via an actuating member 63 and the pressure-welding punch 58 (by cutting off the connecting parts 104a of a very small thickness in FIG. 8), and placed on the support device 53.

In this case, the component members 101~105 are easily punched out and laminated into one piece by the pressure-welding punch 58 since the component members 101~105 are connected to the workpiece 4 via the connecting parts 104a of a very small thickness, as shown in FIG. 8, and the adjoining component members are laminated together as the dowel pins 107 are engaged with the dowel holes 106, as shown in FIG. 4.

Since the hole 55 provided on the holding plate 56 of the holding device 52 is formed larger than the maximum outside contours of the component members 101~105, any of the component members 101~105 can be passed through the hole 55. The support device 53 for supporting the component members 101~105 should preferably be constructed in such a manner that as the component members 101~105 are laminated and pressure welded with the pressure-welding punch 58, the support device 53 can descend by the amount of the thickness of the component members 101~105 and stop at that position. After having been formed in the aforementioned manner, the laminate 100 shown in FIG. 3 is discharged from the support device 53, and the next laminating and pressure-welding operations are repeated.

Figure 10:
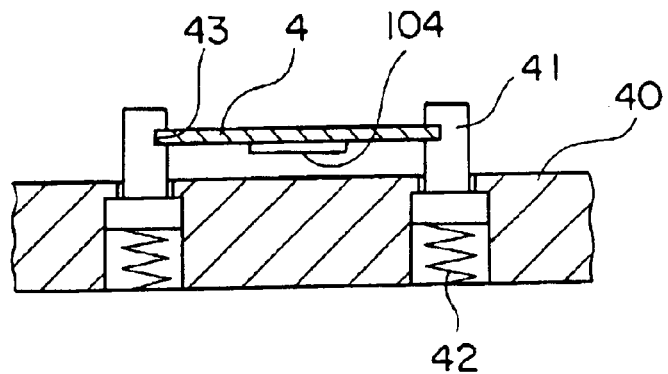
FIG. 10 is an enlarged cross-sectional view illustrating the manner in which the workpiece is supported.

FIG. 10 is an enlarged cross-sectional view showing the state where the workpiece is supported. In the present invention, the component member 104 formed with the non-separating indentation process protrudes at least by d-δ towards the lower surface of the workpiece 4, as shown in FIG. 8, posing a problem of the protruded part interfering with the component of the device during transportation of the workpiece 4. The workpiece 4 must therefore be transported in a suspended state, as shown in FIG. 10.

In FIG. 10, numeral 40 refers to a base plate that is shown as a typical component of the punch-die set or the laminating device facing the workpiece 4. Numeral 41 refers to a guide pin mounted in a vertically movable manner and preloaded upward by a spring 42. A groove 43 is provided in the vicinity of the upper end of the guide pin 41; the width of the groove 43 being formed slightly larger than the thickness of the workpiece 4 to facilitate the movement of the workpiece 4.

With the aforementioned construction, the workpiece 4 is kept in a suspended state during transportation, as shown in FIG. 10, while during the operation of the device, the guide pin 41 descends as the actuating member of the device descends, and is returned upward by the spring 42 after the operation.

Figure 11:
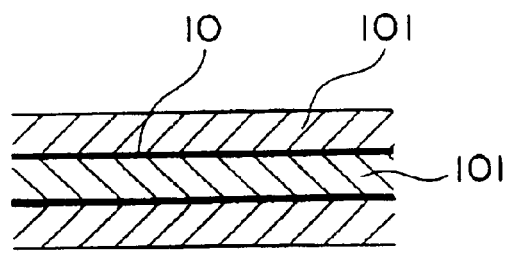
FIG. 11 is an enlarged longitudinal sectional view illustrating the state where component members made from another example of workpiece in an embodiment of the present invention are laminated.

FIG. 11 is an enlarged longitudinal sectional view showing the state where the component members made of another example of the workpiece are laminated in an embodiment of the present invention.

In FIG. 11, numeral 10 refers to adhesive applied between the component members 101 and 101, for example to tightly bond the component members during lamination and pressure-welding, or during heat treatment after lamination. To achieve this laminated state, a workpiece the surface of which is coated in advance with an adhesive or a thermocompression sheet of a thickness of 10~50 μm can be used.

Figure 12:
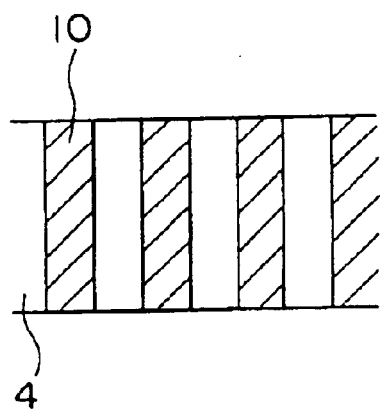
FIG. 12 is a plan view illustrating the state where component members made from still another example of workpiece in an embodiment of the present invention are laminated.

FIG. 12 is a plan view showing another example that is an alternative to the example shown in FIG. 11 where the adhesive is deposited over the entire surface.

The hatched portion in FIG. 12 shows the adhesive applied to the surface of the workpiece 4 in stripes or bands. When the laminate 200 as shown in FIG. 5, for example, is formed using this workpiece 4 having stripes or bands of adhesive, very small gaps are formed between the adhesive applied in stripes or bands. Thus, the gears, cams or other parts of the laminate 200 can be lubricated by spreading or storing a lubricant between these very small gaps. It may be effective for the lubrication of the laminate 200 to use the workpiece 4 on the surface of which a thin film containing a lubricant such as fine powders of carbon, for example, is deposited.

Figure 13:
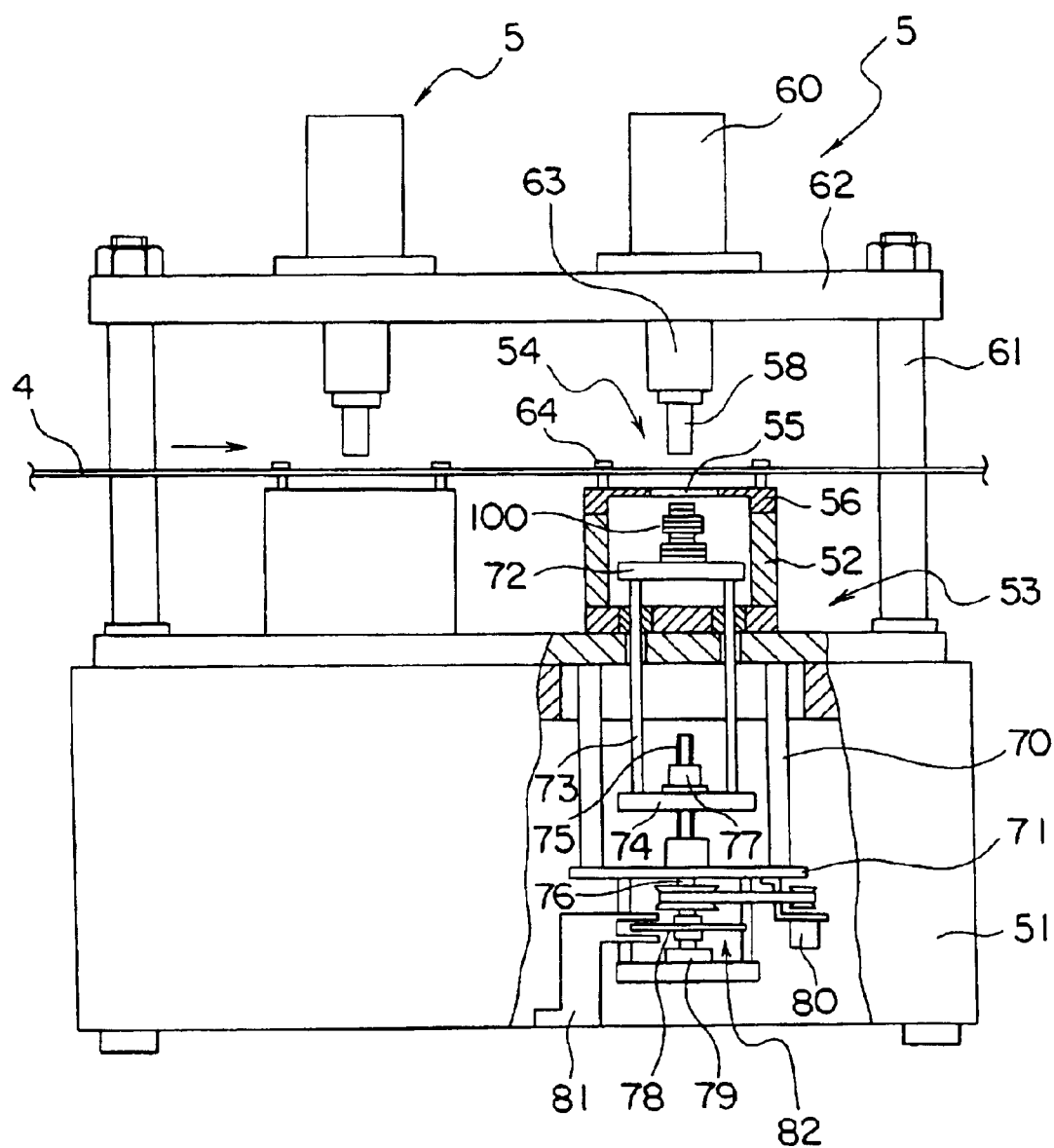
FIG. 13 is a partially cross-sectional front view of an example of the laminating device in an embodiment of the present invention.
Figure 14:
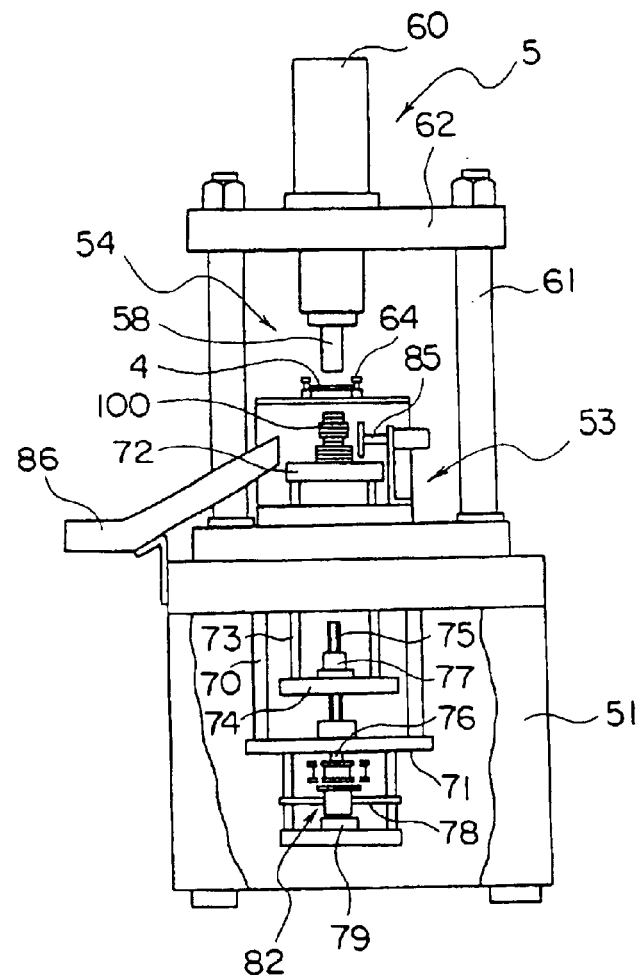
FIG. 14 is a side view of the construction shown in FIG. 13.

FIG. 13 is a partially cross-sectional front view showing an example of the laminating device in an embodiment of the present invention, and FIG. 14 is a side view of the construction shown in FIG. 13. Like parts are indicated by like numerals used in FIG. 6.

In FIGS. 13 and 14, two sets, for example, of the laminating device 5 are disposed at intervals of nP with the punch-die set 2 on the most downstream side in the feeding direction of the workpiece 4, as shown in FIG. 6. Intervals of the laminating devices 5 and 5 are set to sP (s being a given positive integer), and the s value should preferably be as small as possible.

A material guide 64 is vertically movably provided on the holding plate 56 in such a manner that the material guide 64 is engaged with the longitudinal edge of the workpiece 4 while allowing the longitudinal movement of the workpiece 4 and constraining the movement of the workpiece 4 in the direction orthogonal to the feeding direction.

Now, the construction of the support device 53 will be described in the following. The entire support device 53 is supported in the base 51 by a support rod 70 and a support plate 71 provided on the base 51.

Numeral 72 is a pedestal supported by a guide bar 73 provided passing through the base 51, a guide plate 74 and a support shaft 76 provided upright on the support plate 71 and having a male screw 75. Numeral 77 refers to a female screw member provided on the guide plate 74 and screwed to the male thread 75. The male and female screws 75 and 77 should preferably be of multithread to have a maximum lead.

Numeral 78 refers to a disc fixedly fitted to the support shaft 76 below the support plate 71, constituting a disc brake 82 by being selectively pressed by a cylinder (not shown) provided by a caliper 81 provided on the base 51 so that the rotation of the support shaft 76 can be braked or released.

Numeral 80 refers to a drive motor provided on the support plate 71 via a mounting plate to drive the support shaft 76 in forward and backward directions. Numeral 79 refers to a bearing to support the lower end of the support shaft 76.

With the aforementioned construction, when the workpiece 4 on which the component members 101~105 shown in FIG. 3 are formed with the non-separating indentation process by selectively operating a plurality of punch-die sets shown in FIG. 7 is transported onto one laminating device 5 shown in FIGS. 13 and 14 as the final stage, the material guide 64 descends, forcing the workpiece 4 in place on the holding plate 56.

Next, the pressure-welding device 54 is driven by actuating the actuating device 60 to punch out a component member from the workpiece 4 and place them on the pedestal 72 constituting the support device 53. After the pressure-welding punch 58 is retracted upwards, the workpiece 4 is indexed by one pitch P, and the next component member is punched out from the workpiece 4 on the preceding component member in the same manner as the foregoing, and laminated and pressure welded. By actuating the pressure-welding punch 58, and engaging the dowel holes 106 shown in FIG. 4 with the dowel pins 107, the adjoining component members are tightly laminated and pressure welded.

When the component members are laminated and pressure welded with the pressure-welding punch 58, the drive motor 80 is left inactive, but the pedestal 72 can be stopped at that position by putting the disc brake 82 into a braking state. By the pushing force exerted by the pressure-welding punch 58 when laminating and pressure-welding the component members, the male screw engaged with the female screw is caused to rotate via the female screw resisting the braking force of the disc brake 82, and the pedestal 72 descends by the amount equal to the thickness of a component member, and stops at that position. That is, by making the pushing force of the pressure-welding punch 58 larger than the braking force of the disc brake 82, the pedestal 72 on which the component members are placed can repeat sequential descending and stop operations to laminate a predetermined number of component members into one piece to form a laminate 100.

After the laminate 100 has been formed in the foregoing manner, the pressure-welding punch 58 can be lifted by actuating the actuating device 60, and the laminate 100 can be discharged via a discharging chute 86 (refer to FIG. 14) by actuating a discharging device 85. After the laminate 100 has been discharged from the pedestal 72, the drive motor 80 is operated in a state where the disc brake 82 is released to rotate the support shaft 76, thereby causing the pedestal 72 to ascend to a place immediately beneath the holding plate 56 (refer to FIG. 13). The drive motor 80 is then stopped, bringing the disc brake 82 to a braking state to hold the pedestal 72 at that position. Thus, the pedestal 72 is ready to receive the next component member, and the foregoing operations are repeated.

Since the indexing of the workpiece 4 and the processing with the punch-die sets 2 cannot be performed in a laminating device 5 so long as the laminate 100 is discharged and the pedestal 72 is returned to the original position, another laminating device 5 is operated. Thus, the workpiece 4 can be continuously processed without interruption.

That is, by operating the two laminating devices provided in the feeding direction of the workpiece 4, the entire equipment can be continuously operating with improved processing efficiency (though both the devices may be temporarily operated simultaneously when operation is shifted from a laminating device 5 on the downstream side in the feeding direction of the workpiece 4 to another laminating device 5 on the upstream side).

More than two laminating devices 5 can be provided to permit them to be operated alternately, taking into consideration processing time and other factors in the laminating device 5.

Figure 15:
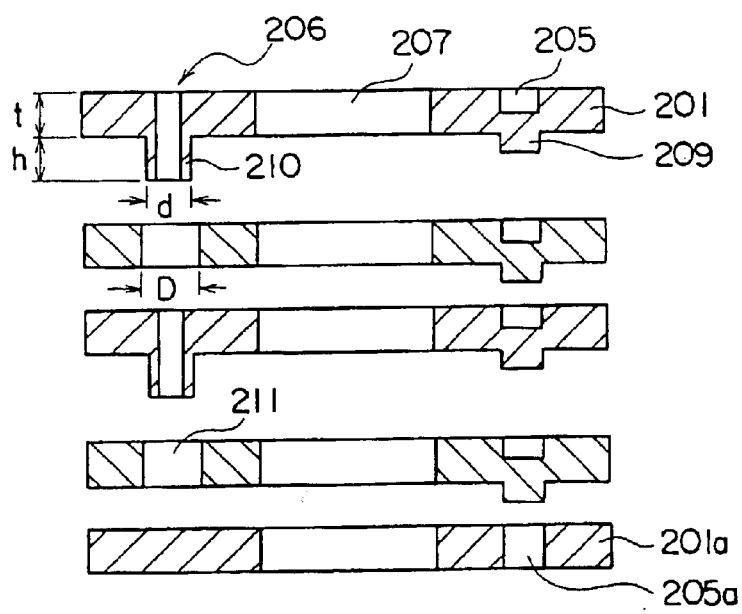
FIG. 15 is an enlarged longitudinal sectional view illustrating an example of the state where component members are bonded together in another embodiment of the present invention.
Figure 16:
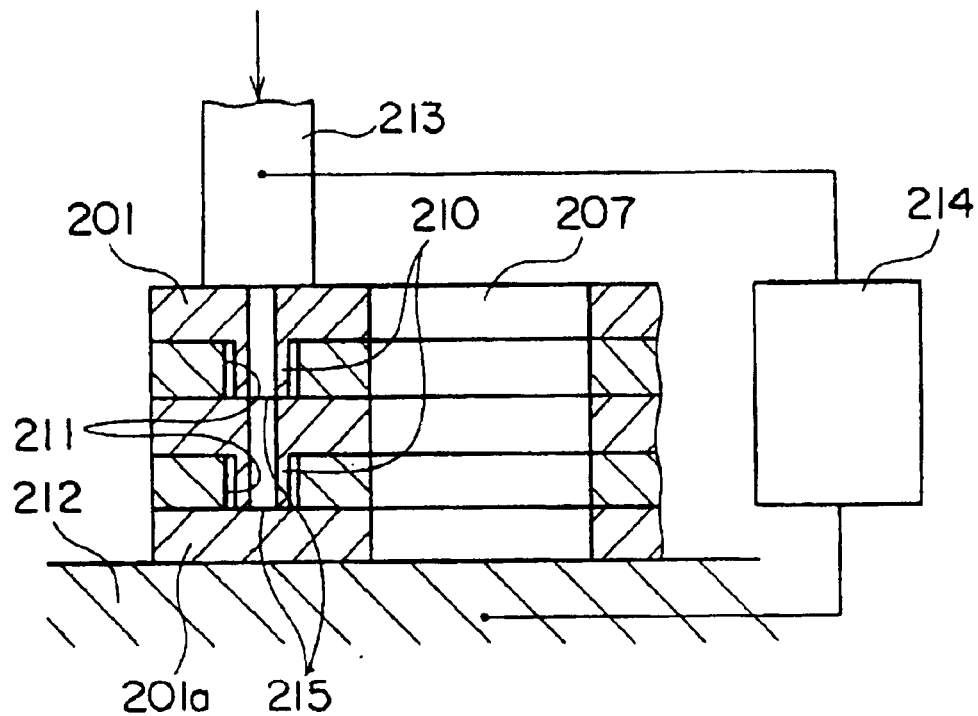
FIG. 16 is an enlarged longitudinal sectional view illustrating an example of the state where component members are bonded together in another embodiment of the present invention.

FIGS. 15 and 16 are enlarged longitudinal sectional views showing examples of the state where the component members are bonded together in another embodiment of the present invention. In FIGS. 15 and 16, description is limited to the component member 201, but same applies to the other component members 202~204.

In FIG. 15, numeral 209 refers to a dowel pin formed concentrically with the dowel hole 205. Numeral 210 refers to a projection formed with burring in such a manner as to protrude towards the lower part of the component member 201. The projection 210 is formed into a hollow cylindrical shape, for example, with the outside diameter being d and the height h, in such a fashion that h=t+α, i.e., h>t where α is a welding allowance set to a size enough to form a weld during welding, which will be described later. The welding allowance α can be determined appropriately, depending on the material, thickness t of the component member 201 and the height of the projection. As welding means, spot welding, resistance welding, brazing or other appropriate means can be used.

Numeral 211 is a clearance hole formed passing through the component member 201 at a location corresponding to the projection 210. The clearance hole 211 is formed into a round shape, for example, in such a fashion that D>d where D is the inside diameter, so that the outside surface of the projection 210 is not electrically connected to the inside surface of the clearance hole 211 when the component member 201 is laminated, as will be described later. More specifically, a non-contact state, that is, a gap of more than 0.2 mm, for example, is maintained between the outside surface of the projection 211 and the inside surface of the clearance hole 211. Note that only a dowel through hole 205a is provided on the component member 201a constituting the lowest layer, and neither a projection 210 nor a clearance hole 211 is formed on it.

With the aforementioned construction, a component member 201a and a component member 201 having a clearance hole 211 can be laminated into one piece by placing the component member 201a on the pedestal 212 made of an electrically conductive material, positioning the component member 201 having the clearance hole 211 by engaging the dowel hole 205a with the dowel pins 209, and pressure-welding both via the pressure-welding electrode 213, as shown in FIG. 16.

Next, another component member 201 having a projection 210 can be welded by positioning the component member 201 by engaging the dowel hole 205 with the dowel pin 209, pressing the component member 201 via the pressure-welding electrode 213 in such a manner that the tip of the projection 210 passes through the clearance hole 211 on the underlying component member 201 and comes in contact with the other component member 201 that is in a non-contact state, and feeding a current from a welding power supply 214 between the pressure-welding electrode 213 and the pedestal 212 to form a weld 215 at the tip of the projection 210.

With the construction shown in FIG. 15, five component members 201 can be tightly bonded together, as shown in FIG. 16, by positioning the component member 201 having the projection 210 by engaging the dowel hole 205 with the dowel pin 209, pressing the component member 201 via the pressure-welding electrode 213 in such a manner that the tip of the projection 210 passes through the clearance hole 211 on the underlying component member 201 and comes in contact with the other component member 201 that is in a non-contact state, and feeding a current from a welding power supply 214 between the pressure-welding electrode 213 and the pedestal 212 to form a weld 215.

In FIGS. 15 and 16, an example where a component member 201 having a clearance hole 211 and a component member 211 having a projection 210 are laminated alternately is shown. A plurality of component members 201 having clearance holes 211 may be laminated consecutively. In such a case, the height h of the projection 210 is set to a value such that h> at (a being a positive integer larger than 1). That is, the height h of the projection 210 may be set appropriately, depending on the number of component members to be laminated consecutively.

The pressure-welding electrode 213 is naturally made of an electrically conductive material, and should have such a construction that electric current can be fed intensively to the projection at which welding is performed, and be equipped with appropriate cooling means since a relatively large current flows therein.

Figure 17:
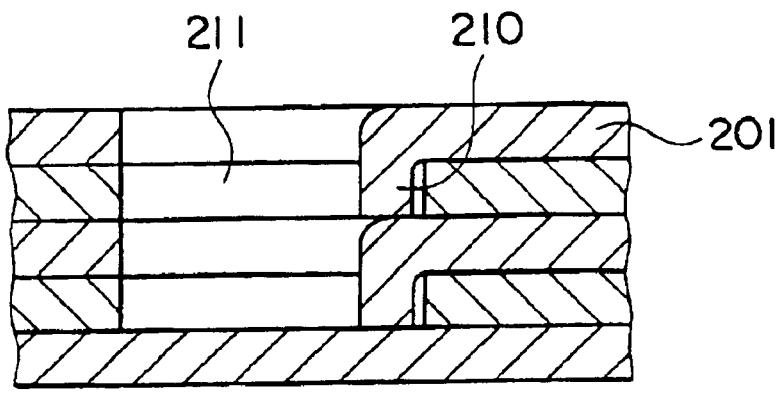
FIG. 17 is an enlarged cross-sectional view illustrating an example of projections and clearance holes.

FIG. 17 is an enlarged cross-sectional view showing another example of the projection and the clearance hole.

In FIG. 17, the projection 210 is formed by slitting and forming into an L-shaped lug, while the clearance hole 211 is formed into a slotted hole. With this construction, not only the aforementioned operations can be achieved, but also the weight of the component member 201 can be reduced, particularly suitable for component members for which weight reduction is required. Aside from those described above, the projection 210 and the clearance hole 211 can be of various shapes.

Figure 18:
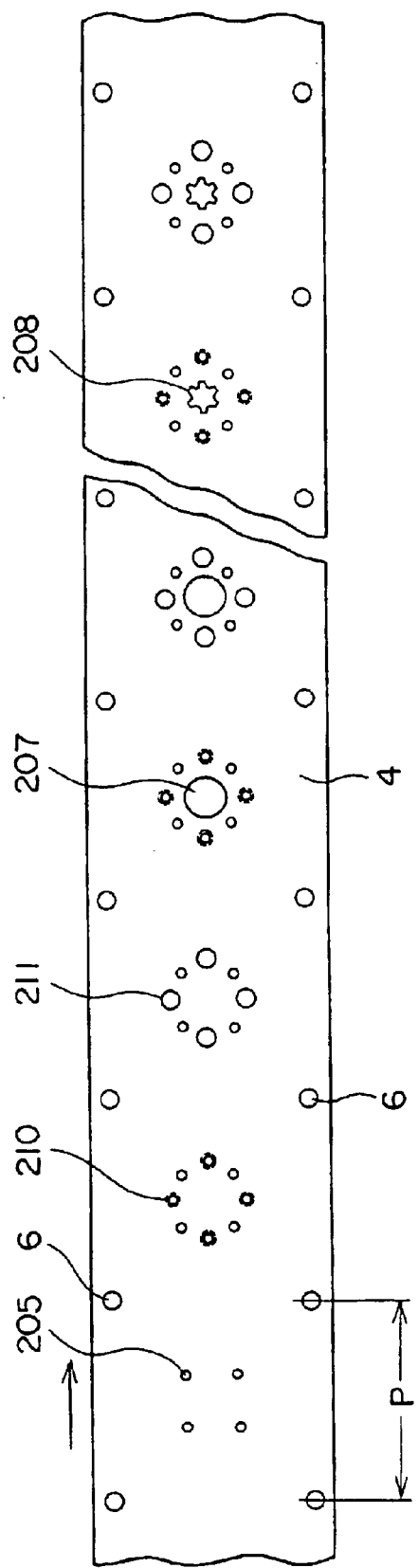
FIG. 18 is a plan view illustrating part of the state where a workpiece is processed in another embodiment of the present invention.

FIG. 18 is a plan view showing part of the state where the workpiece is processed in another embodiment of the present invention, that is, part of the component members 201~204 for manufacturing the laminate 200 shown in FIG. 5.

In FIG. 18, the workpiece 4 is indexed at predetermined intervals of P by the feeding device shown in FIG. 6. Numeral 6 refers to pilot holes that are processed regularly on the workpiece 4 at intervals P by the punch-die set 2 on the most upstream side shown in FIG. 6 and serve as reference holes for positioning in the subsequent processes.

Next, the dowel holes 205 and dowel pins (not shown. Refer to numeral 209 in FIG. 15.) that are concentric with the dowel holes 205 are formed with the punch-die set 2 as described above. In this case, pilot pins engaging with the pilot holes 6 are provided on the punch-die set 2 so that the punch-die set 2 is positioned using the pilot holes 6 as reference holes (same applies to the punch-die sets in the subsequent processes.)

Next, the projections 210 and the clearance holes 211 are selectively processed as the workpiece 4 is sequentially indexed at intervals of P. In this case, the projections 210 and the clearance holes 211 are alternately processed for a laminate formed by alternately laminating component members 210~204, whereas the clearance holes 211 are processed consecutively for a laminate formed by consecutively laminating a plurality of the component members. Thereafter, a predetermined number of round holes 207 are processed consecutively on the component member 201, and a predetermined number of spline holes are processed consecutively on the component members 202~204. The outside contours of the component members 201~204 are processed with the non-separating indentation process as the workpiece 4 is sequentially indexed at intervals of P.

To carry out the aforementioned indexed processing, six types of punch-die sets corresponding to the round holes 207, the spline holes 208, and the outside contours of the component members 201~204 are disposed, in addition to the punch-die sets (to be operated at all times) having punches and dies for processing the pilot holes 6, the dowel holes 205 and the dowel pins 209; these punch-die sets adapted to be selectively operable. With this arrangement, six pieces each of the component members 201 and five each of the component members 202~204 corresponding to the laminate 200 shown in FIG. 5, for example, are formed and transported to the final stage, together with the workpiece 4.

The component members 201~204 processed on the workpiece 4 with the non-separating indentation process in this way are transported to the laminating device provided in the final stage in FIG. 6, and are sequentially laminated in the order of the component members 204 through 201, with the component member 201 interposed therebetween. That is, as the guide member 57 descends, the pilot pins are engaged with the pilot holes 6 on the workpiece 4 for positioning, and then the component members 201~204 are sequentially punched out from the workpiece 4 via the actuating member 63 and the pressure-welding punch 58 by actuating the actuating device 60 and placed on the support device 53.

Figure 19:
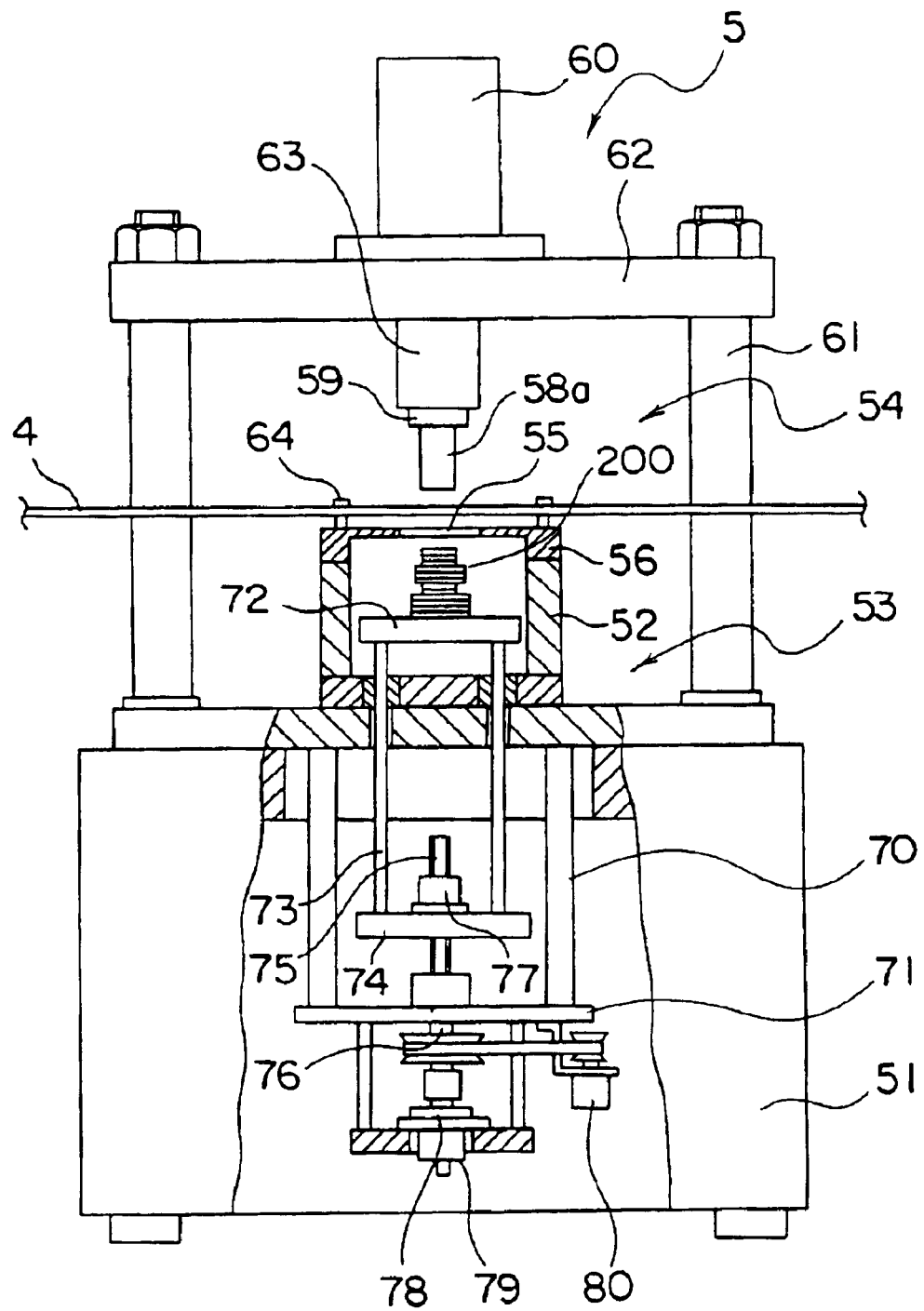
FIG. 19 is a partially cross-sectional front view illustrating another example of the laminating device in an embodiment of the present invention.
Figure 20:
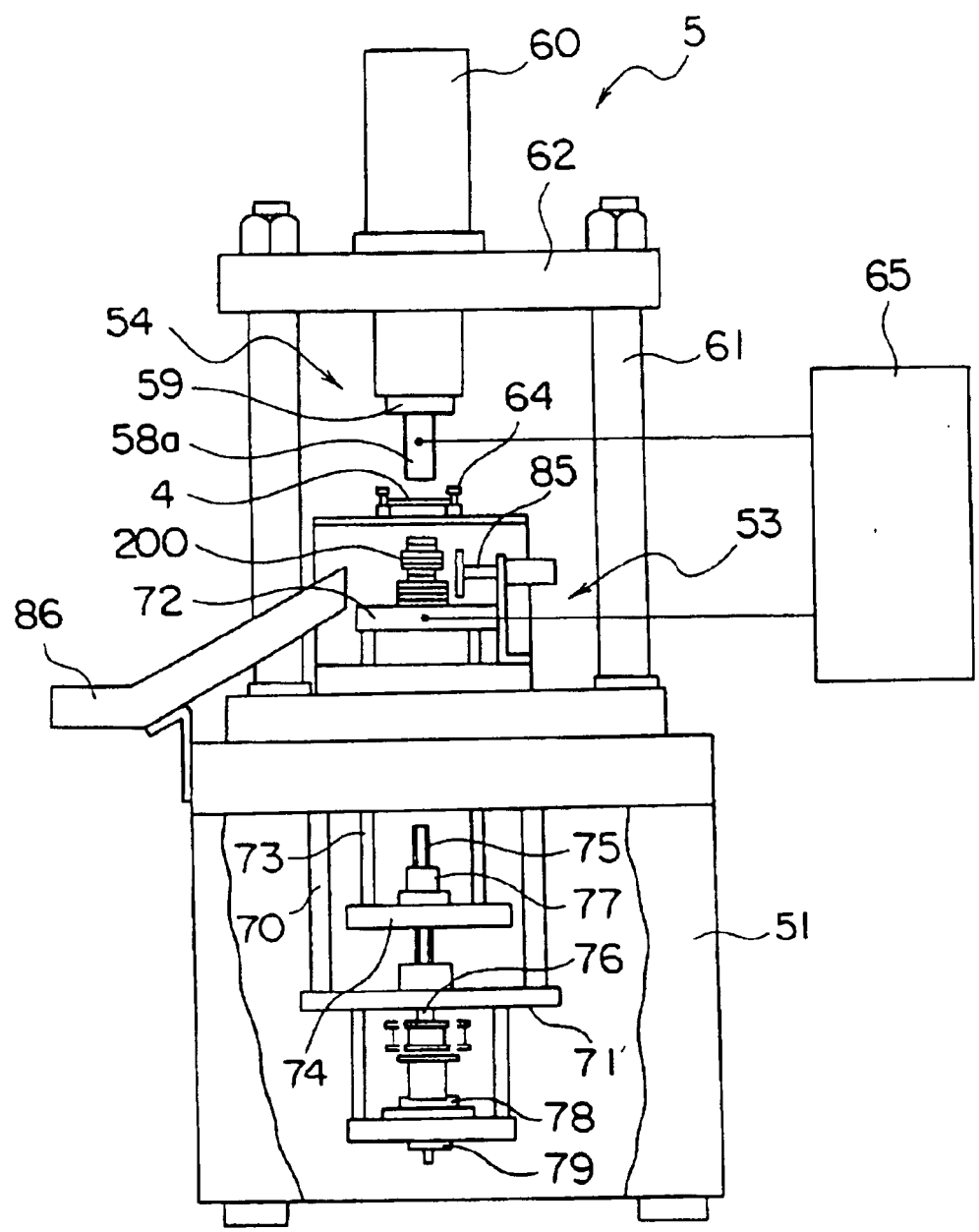
FIG. 20 is a side view of the construction shown in FIG. 19.

The laminating device used in this case requires to have a welding power supply, as shown in FIGS. 19 and 20. That is, FIG. 19 is a partially cross-sectional front view showing another example of the laminating device in an embodiment of the present invention, and FIG. 20 is a side view of the construction shown in FIG. 19. Like parts are indicated by like numerals used in FIGS. 13 and 14.

In FIGS. 19 and 20, a vertically movable pressure-welding electrode 58a is provided on the pressure-welding device 54 to punch out the component members from the workpiece 4. The pressure-welding electrode 58a is made of an electrically conductive material, and fixedly fitted to the actuating member 63 via a spacer made of an insulating material. Numeral 65 is a welding power supply connected between the pressure-welding electrode 58a and the support device 53, adapted to selectively operable.

When punching out the component members 201~204, the component members 201~204 are guided by a connecting part 104a (refer to FIG. 8) formed on the workpiece 4 and laminated into one piece since the dowel holes 205 are engaged with the dowel pins 209 on the adjoining component members, as shown in FIG. 15, and a weld 215 is formed at the tip of the projection 210.

Since the hole 55 provided on the holding plate 56 on the holding device 52 is formed larger than the maximum outside contours of the component members 201~204, any of the component members 201~204 can be passed through the hole without hindrance.

The support device 53 for supporting the component members 201~204 should preferably be such that the support device 53 descends by the amount of the thickness of the component members 201~204 and stops at that position every time the component members 201~204 are laminated and pressure welded by the pressure-welding electrode 58a.

After the laminate 200 shown in FIG. 5 is formed in the aforementioned manner, the laminate 200 is discharged from the support device 53, and the next laminating and pressure-welding operations are repeated. The continuous operation of the entire device by installing a plurality of the laminating devices 5 is similar to the aforementioned embodiment.

In the aforementioned embodiments, description has been made about the positioning of the component members by engaging the dowel holes with the dowel pins. The present invention, however, is not limited to it, but positioning can be accomplished by providing guide holes passing through the outside contours of the component members and engaging the guide holes with the guide pins for lamination, or engaging the outside contours of the component members with the guide pins.

Industrial Applicability

The present invention having the aforementioned construction and operation can achieve the following beneficial effects.

(1) Even complex laminates that cannot be processed with normal machining operations can be manufactured relatively easily.
(2) Any local changes to the specification of the laminate can be quickly coped with by changing part of the component members. This enables limited production of diversified products.
(3) Despite the lamination of sheet materials, the component members can be tightly bonded together, making it possible to manufacture highly functional laminates. By welding the component members, the bonding strength of the component members can be improved.
(4) Since multiple types of component members are formed with the non-separating indentation process without punched out from the workpiece, and transported together with a long-sized workpiece, or multiple types of component members are manufactured with indexed processing, together with the long-sized workpiece, processes and parts can be easily controlled, enabling highly efficient, low-cost production through integrated production starting from raw material.
(5) By providing a plurality of laminating devices and operating them alternately, the entire device can be operated continuously without interrupting the processing of the workpiece. This leads to substantially improved processing efficiency.

What is claimed is:

1. A method for sequentially manufacturing component members having different shapes comprising
    indexing a long-sized workpiece in the longitudinal direction,
    indexing the component members having different shapes after the outside contours thereof have been formed with non-separating indentation with at least part of the outside contours thereof left unseparated from the workpiece, and
    separating each of the component members from the workpiece in the final stage of indexing of the workpiece.

2. A method for manufacturing laminates comprising a plurality of continuously formed component members having different cross-sectional shapes comprising
    indexing a long-sized workpiece in the longitudinal direction,
    forming the component members having different outside contours corresponding to each of the cross-sectional shapes of the laminate with non-separating indentation, with at least part of the outside contours thereof left unseparated from the workpiece, and
    sequentially punching out the component members from the workpiece and laminating the component members into one piece in the final stage of indexing of the workpiece.

3. A method for manufacturing laminates as set forth in claim 2 wherein dowel pins and dowel holes are formed concentrically on the component members, and the dowel pins are engaged with the dowel holes on the adjoining component members.

4. A method for manufacturing laminates as set forth in claim 3 wherein a through hole is formed on the component member on the lowest layer.

5. A method manufacturing laminates as set forth in claim 2 wherein a plurality of guide through holes are formed on the component members, and the component members are positioned by engaging the guide pins with guide holes in the final stage of indexing.

6. A method for manufacturing laminates as set forth in claim 2 wherein a workpiece on the surface of which adhesive is deposited is used.

7. A method for manufacturing laminates as set forth in claim 6 wherein the adhesive is deposited in stripes or bands.

8. A method for manufacturing laminates as set forth in claim 2, wherein a workpiece on the surface of which a thin film containing lubricant is deposited is used.

9. A method for manufacturing laminates comprising a plurality of continuously formed component members having different cross-sectional shapes; the component members having outside contours corresponding to the cross-sectional shapes of the laminate being formed from a sheet material and sequentially laminated into one piece comprising
    indexing a long-sized workpiece in the longitudinal direction,
    forming clearance holes within the outside contours of the component members, or projections at locations corresponding to the clearance holes,
    forming the component members having predetermined outside contours with non-separating indentation, with at least part of the outside contours left unseparated from the workpiece,
    sequentially punching out the component members from the workpiece and laminating the component members into one piece in the final stage of indexing of the workpiece, and
    causing the projections to pass through the clearance holes on the underlying component member and welding the component member with the non-adjoining component member into one piece.

10. A method for manufacturing laminates as set forth in claim 9 wherein an irregular-shaped laminate having different cross-sectional shapes comprising continuously formed component members having different outside contours and/or outside dimensions is formed.

11. A method for manufacturing laminates as set forth in claim 9 wherein the projections are formed in such a manner that h>a (a being a positive integer larger than 1) when the thickness of the workpiece is t, and the height of the projections is h.

12. A method for manufacturing laminates as set forth in claim 9 wherein the projections are formed with burring or slitting and forming operation.

13. A method for manufacturing laminates as set forth in claim 9 wherein the outside surface of the projections is kept electrically unconnected to the inside surface of the clearance holes.

14. A method for manufacturing laminates as set forth in claim 9 wherein dowel holes and dowel pins are formed concentrically on the upper and lower surfaces within the outside contours of the component members, and the adjoining component members are laminated by engaging the dowel holes with the dowel pins thereof.

15. An apparatus for manufacturing laminates comprising a plurality of continuously formed component members having different cross-sectional shapes comprising a feeding device for indexing a long-sized workpiece in the longitudinal direction, a plurality of punch-die sets disposed in the feeding direction of the workpiece for forming multiple types of component members having outside contours corresponding to each of the cross-sectional shapes of the laminate with non-separating indentation, with at least part of the outside contours left unseparated from the workpiece, and a laminating device disposed on the most downstream side of the punch-die sets in the feeding direction of the workpiece for sequentially punching out the component members from the workpiece and laminating the component members into one piece; the punch-die sets being selectively operable.

16. An apparatus for manufacturing laminates comprising continuously formed component members having different cross-sectional shapes; the component members having outside contours corresponding to the cross-sectional shapes of the laminate being formed from a sheet material and sequentially laminated into one piece comprising a feeding device for indexing a long-sized workpiece in the longitudinal direction, a plurality of first punch-die sets for clearance holes passing through the outside contours or projection, a plurality of second punch-die sets for a plurality of the component members with non-separating indentation, with at least part of the outside contours left unseparated from the workpiece, and a laminating device disposed on the most downstream side in the feeding direction of the workpiece;

the laminating device comprising a holding device having a hole for allowing the component members to pass and formed in such a manner as to constrain the downward movement of the workpiece, a pressure-welding device disposed above the holding device and having a vertically movable pressure-welding electrode for punching out, laminating and pressure-welding the component members, and a support device provided below the holding device and having a vertically movable support member that can hold in place the punched out component members;

a selectively operable welding power supply being connected between the pressure-welding device and the support device.

17. An apparatus for manufacturing laminates as set forth in claim 16 wherein a plurality of the laminating devices are provided in the feeding direction of the workpiece; the laminating devices adapted to be operated alternately.

18. An apparatus for manufacturing laminates comprising a plurality of continuously formed component members having different cross-sectional shapes; the component members having outside contours corresponding to the cross-sectional shapes of the laminate being formed from a sheet material and sequentially laminated into one piece comprising a feeding device for indexing a long-size workpiece in the longitudinal direction, a plurality of punch-die sets for forming a plurality of component members with non-separating indentation, with at least part of the outside contours left unseparated from the workpiece, and a laminating device disposed on the most downstream side in the feeding direction of the workpiece for sequentially punching out, laminating the component members into one piece;

the laminating device comprising a holding device having a hole for allowing the component members to pass and formed in such a manner as to constrain the downward movement of the workpiece, a pressure-welding device disposed above the holding device and having a vertically movable pressure-welding punch for punching out, laminating and pressure-welding the component members, and a support device provided below the holding device and having a vertically movable support member that can hold in place the punched out component members;

a plurality of the laminating devices being provided in the feeding direction of the workpiece and adapted to be operated alternately.

19. An apparatus for manufacturing laminates as set forth in claim 16, wherein the support member descends by an amount equal to the thickness of the component members and stops at that position every time the component members are laminated and pressure welded by the pressure-welding device.

20. An apparatus for manufacturing laminates as set forth in claim 16, wherein a punch-die set for forming dowel holes and dowel pins concentrically on the upper and lower surface within the outside contours of the component members is provided.

* * * * *